March 19, 1963  E. P. WISE  3,081,985
DECELERATION AIR BLEED FOR FUEL CHARGING MANIFOLD
Filed Nov. 3, 1960
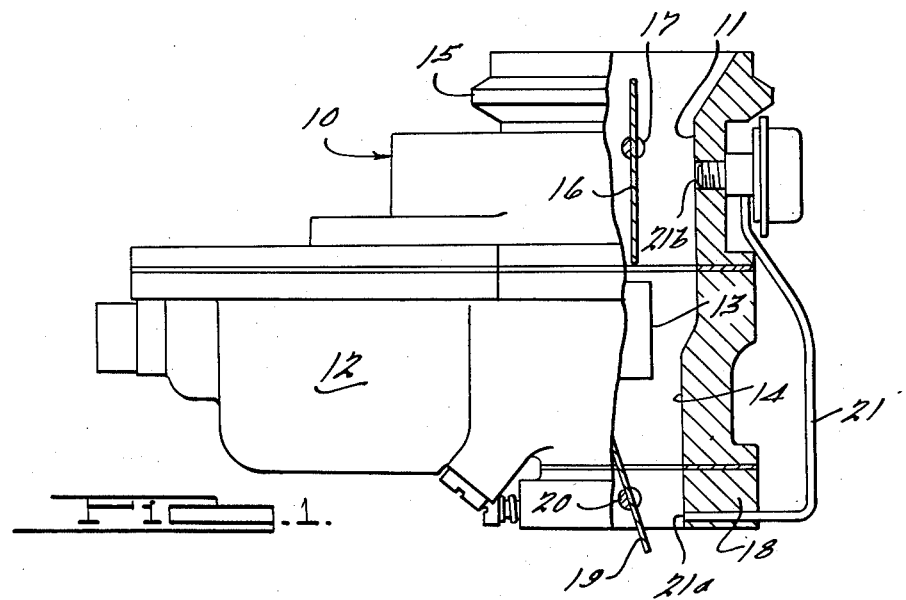
INVENTOR.
Eugene P. Wise.
BY Harness & Harris
ATTORNEYS.

United States Patent Office 3,081,985
Patented Mar. 19, 1963

3,081,985
DECELERATION AIR BLEED FOR FUEL
CHARGING MANIFOLD
Eugene P. Wise, Bloomfield Hills, Mich., assignor to Chrysler Corporation, Highland Park, Mich., a corporation of Delaware
Filed Nov. 3, 1960, Ser. No. 66,985
7 Claims. (Cl. 261—42)

This invention relates to improvements in a fuel charging device for an internal combustion engine and in particular to means for preventing stalling of the engine of an automotive vehicle with an excessively rich fuel-air mixture when the vehicle is suddenly stopped or declutched from a condition of operation at comparatively high load.

As long as an automobile is in gear and moving, stalling of the engine by a momentary over-rich fuel mixture is not a common problem because the momentum of the vehicle will drive the engine until the excess fuel is exhausted. When it is necessary to stop an automobile suddenly or declutch the engine from a condition of substantially wide open throttle, for example, the evaporation of raw fuel which normally collects in the induction conduit downstream of the open air-throttle valve tends to enrich the fuel-air mixture excessively as soon as the air supply is cut off by closing of the throttle valve. In consequence the engine frequently stalls. In order to overcome this problem, it has been common heretofore to employ a dashpot to retard return movement of the throttle to its closed position, thereby to enable the engine to decelerate gradually and burn the excess fuel accumulated in the induction conduit. The use of such a dashpot however interferes with the normal return of the throttle to its closed position, frequently results in an inconsistent throttle return, and requires a comparatively strong throttle return spring to operate against the dashpot. In addition the dashpot must be installed in the throttle linkage with the carburetor where space for the installation is not always readily available. In consequence additional difficulty and expense are encountered.

An object of the present invention is to provide a comparatively simple and effective means for overcoming the foregoing difficulties while at the same time avoiding stalling of an automobile engine by an excessively rich fuel-air mixture during the above mentioned conditions.

Another object is to provide means for temporarily bypassing the customary throttle valve in the induction conduit for an automotive engine when the throttle valve is suddenly closed, thereby to supply air downstream of the throttle valve for a short time interval sufficient to clear unburned fuel from the induction conduit and to prevent stalling of the engine, for example when the vehicle is suddenly stopped or the engine is declutched from its connection with the automobile driveshaft.

Another object is to provide such a structure comprising a bypass conduit connected with the induction conduit both upstream and downstream of the throttle valve. A normally closed pressure actuated time delay valve in the bypass conduit opens the latter momentarily when the pressure downstream of the throttle valve is rapidly decreased, as for example when the throttle valve is rapidly closed. Thereafter the time delay valve will close to enable resumption of normal operation of the fuel system. During the short time interval of for example two to four seconds that the bypass conduit is open, a controlled quantity of air from upstream of the throttle valve is discharged via the bypass conduit into the induction conduit downstream of the throttle valve to dilute the fuel-air mixture thereat sufficiently to permit normal combustion in the engine until the excess fuel in the downstream portion of the induction conduit is burned and exhausted through the engine.

Another and more specific object of the invention is to provide such a construction wherein the time delay valve is operated by a pressure actuated diaphragm partitioning a pressure chamber into two parts, one part being in communication with the induction conduit downstream of the throttle valve to actuate the diaphragm and open the bypass conduit in response to a sudden decrease in the pressure downstream of the throttle valve. A restricted bleed orifice connecting the two parts of the pressure chamber substantially equalizes the pressure at opposite sides of the diaphragm when the low pressure downstream of the throttle valve has persisted for the required time interval, thereby to enable return of the time delay valve to its normally closed position to close the bypass conduit.

Still another object is to provide a bleed orifice as aforesaid in combination with an unrestricted pressure equalizing duct connecting the two parts of the pressure chamber. A one-way check valve is arranged in the unrestricted pressure equalizing duct to open the same to enable rapid equalization of the pressure in said two chamber parts when the pressure in said one part is rising rapidly, and to close the unrestricted pressure equalizing duct when the pressure in said one part and consequently the pressure downstream of the throttle valve is rapidly decreasing.

In accordance with the foregoing, the pressure actuated diaphragm is readily responsive to decreasing pressure changes downstream of the throttle valve to open the bypass valve momentarily until the excess downstream fuel is exhausted. In the event that the engine is then idled for sufficient time to enable the restricted bleed orifice to equalize the pressure at opposite sides of the pressure actuated diaphragm, and a sudden short burst of power is then demanded, the unrestricted pressure equalizing port will immediately open to reset the pressure actuated diaphragm for subsequent immediate operation to open the bypass port when the throttle valve is again closed upon termination of the aforesaid sudden short burst of power.

Other objects of this invention will appear in the following description and appended claims, reference being had to the accompanying drawings forming a part of this specification wherein like reference characters designate corresponding parts in the several views.

FIGURE 1 is a fragmentary side elevational view of a carburetor for an internal combustion engine, parts being broken away to show details of construction.

FIGURE 2 is an enlarged mid-sectional view through a bypass valve employed in the present invention.

FIGURE 3 is a sectional view taken in the direction of the arrows substantially along the line 3—3 of FIGURE 2.

FIGURE 4 is a view similar to FIGURE 2 but illustrating a modification.

It is to be understood that the invention is not limited in its application to the details of construction and arrangements of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a particular embodiment of the present invention is illustrated by way of example in an automobile carburetor comprising a body 10 defining an induction conduit 11 comprising part of the fuel and air inlet manifold which is connected in accordance with conventional practice with the cylinders of the engine. The carburetor may be of customary construction and includes a fuel bowl 12 from which fuel is conducted to a small venturi 13 and is thus discharged into the conduit 11 in accordance with the volume of air flow therein. The lower end of venturi 13 discharges into a large venturi 14 formed in the conduit 11 which receives atmospheric air through an air filter, not shown, connected with the carburetor air horn 15. An unbalanced choke valve 16 is pivotally mounted on a transverse spindle 17 supported by the carburetor body 10. Below the body 10 is secured a throttle body 18 which defines a continuation of conduit 11 in which a pivotal throttle valve 19 is mounted on a spindle 20 journalled in the sides of body 18. The valves 16 and 19 operate in a conventional manner and are accordingly not described in further detail.

The valve 19 may be designed for manual operation and is opened or closed to regulate the air flow through conduit 11 in accordance with the load requirements of the engine. During normal operation at high engine load or wide open throttle, the pressure in conduit 11 at the region of the throttle 19 is comparatively high and is substantially the same both above and below the throttle 19. During such operation liquid fuel discharging from the small venturi 13 tends to condense along the side walls of the conduit 11 below valve 19. When the throttle valve 19 is closed, the pressure downstream thereof immediately drops and the liquid fuel condensate tends to evaporate, with the result that the fuel air mixture supplied to the engine is momentarily excessively rich for the reduced load. Poor combustion and stalling of the engine frequently results.

In order to avoid such an occurrence, a bypass conduit 21 provided which communicates with induction conduit 11 at port 21a downstream of the valve 19 and at port 21b in the high pressure region of conduit 11. Bypass conduit 21 is normally maintained closed by the ball element 22 of a bypass valve seated at an annular valve seat 23 formed at the mouth of a reduced portion 24 of a valve chamber 25 in a valve housing 26. The latter is provided with a tubular threaded stem 27 screwed into the side wall of conduit 11 at the region of the port 21b to effect communication between the latter and port 21a when ball 22 is unseated. A spring 28 seated within valve chamber 25 between a resilient C-ring 29 and ball 22 normally urges the latter against seat 23 to close the communication between ports 21b and 21a.

The ball element 22 is unseated from valve seat 23 by operation of a valve actuating plunger 30 slidable horizontally through a reduced outer opening 24a of chamber 24 and secured by means of a pair of clamping plates 31 to a flexible diaphragm 32. The latter partitions a pressure container 33 into two parts 34 and 35, the periphery of diaphragm 32 being clamped between mating peripheral flanges of the container 33. In the present instance, a base portion 33a of container 33 is secured to the valve housing 26 for support thereby. A bore 36 opening axially from the right in plunger 30 is partially filled by a nylon plug 37 containing an axially extending restricted bleed duct 38. A radial unrestricted port 39 opens from bore 36 inwardly of plug 37 and communicates with chamber part 35. Similarly a plurality of unrestricted ports 40 in the base 33a connect chamber part 35 with the bypass conduit 21. Thus orifice 38 provides a permanent restricted communication between chamber 34 and port 39 which in turn communicates with chamber 35 and via ports 40 with bypass conduit 21.

It is apparent that during operation of the engine under comparatively high load, the high pressure at port 21a downstream of throttle valve 19 is communicated via conduit 21 to chamber 35 so as to urge diaphragm 32 to the right and enable spring 28 to hold ball 22 at the valve closed position against seat 23. During sustained operation under load, the high pressure in chamber 35 is communicated to chamber 34 through bleed duct 38 until the pressures in chambers 34 and 35 are equalized, whereupon spring 28 continues to maintain ball 22 seated at seat 23 to block communication between ports 21b and 21a.

In the event that throttle 19 is suddenly closed, as for example when the vehicle is suddenly stopped, the resulting reduced pressure at port 21a downstream of valve 19 is communicated via conduit 21 to chamber 35, causing diaphragm 32 and plunger 30 to be moved leftward by pressure in chamber 34. Plunger 30 will then unseat ball 22 against the force of spring 28 and establish communication between ports 21a and 21b. In consequence, the closed valve 19 will be partially bypassed and a predetermined amount of combustion supporting air from the portions of that conduit 11 will be supplied to the lower portions of that conduit downstream of valve 19 to suitably dilute what would otherwise be an excessively rich fuel air mixture. In this regard, conduit 21 is suitably metered or dimensioned to control the airflow therethrough when ball valve 22 is unseated. Substantially normal operation of the engine will result until the excess fuel downstream of valve 19 is exhausted. In the meantime, the high pressure in chamber 34 will bleed through duct 38 until the pressures at opposite sides of diaphragm 32 are substantially equalized. This action will normally require but a few seconds, whereupon spring 28 will return ball 22 to its seated position and close the communication between ports 21b and 21a to restore normal operation of the carburetor.

A modification of the invention is illustrated in FIGURE 4 wherein the structure and operation of the parts are substantially the same as previously described, so that corresponding parts are numbered the same in all views. The distinguishing features of FIGURE 4 are the omission of plug 37 and the enlargement of the bore 36 in the outer end of valve actuator 30 to provide a recess 41 for a check valve ball 42 which is retained in recess 41 by an outer flange 43 of actuator 30. The ball element 42 seats at the base of the recess 41 to close the latter from port 39, except for bleed duct or orifice 44, when the pressure in chamber 34 exceeds the pressure in chamber 35. Bleed duct 44 is provided in the interior side wall of plunger 30 near the base of recess 41 to bypass the seated ball element 42 and effect a restricted communication between chambers 34 and 35 in a manner similar to the bleed orifice 38 of FIGURES 2 and 3.

In accordance with the structure of FIGURE 4, when throttle valve 19 is suddenly closed to decrease the pressure in conduit 11 at the region of port 21a, the reduced pressure is communicated to chamber 35 to urge diaphragm 32 and plunger 30 leftward to unseat ball 22 and thereby to open the bypass conduit 21 momentarily as previously described. After a time interval determined by the size of bleed orifice 44, the pressures in chambers 34 and 35 are equalized to enable reseating of the ball 22 by spring 28. Throughout this time interval, the check ball 42 is closed, so that the only communication between chambers 34 and 35 is via bleed orifice 44.

If throttle valve 19 is subsequently opened rapidly, the increase in pressure at port 21a will be imparted to chamber 35 and will thence be applied through port 39 to the left side of check ball 42 to unseat the latter and render bore 36 an unrestricted pressure equalizing duct, whereby the pressure in chamber 34 is rapidly increased to the value of the pressure in chamber 35. Accordingly the throttle bypass mechanism will be rapidly reset to enable reopening of the bypass conduit 21 immediately when the throttle valve 19 is again rapidly closed. It is apparent that without the provision of check ball 42, whenever throttle valve 19 is closed for a period of time sufficient to induce a low pressure in chamber 34 and then opened rapidly, a slight time delay would occur in re-establishing the pressure in chamber 34 required to open valve 22 in the event that throttle valve 19 is again rapidly closed.

I claim:
1. In a fuel charging system for an internal combustion engine having conduit means for supplying air to said engine, means for supplying fuel to said conduit means, a throttle valve in said conduit means for controlling the air flow therein to said engine, means for bypassing said throttle valve comprising a bypass conduit connecting said conduit means at a location downstream of said throttle valve with air at a pressure equal to the air pressure in said conduit means upstream of said throttle valve, valve means normally closing said bypass conduit, means responsive to a rapid predetermined decrease in pressure at said location for opening said valve means, and time delay means for reclosing said valve means after a predetermined interval regardless of the duration of said predetermined decrease in said pressure at said location.

2. In a fuel charging system for an internal combustion engine having conduit means for supplying air to said engine, means for supplying fuel to said conduit means, a throttle valve in said conduit means for controlling the air flow therein to said engine, means for bypassing said throttle valve comprising a bypass conduit connecting said conduit means at a location downstream of said throttle valve with air at a pressure equal to the air pressure in said conduit means upstream of said throttle valve, valve means normally closing said bypass conduit, pressure actuated means operably connected with said valve means and responsive to a rapid predetermined decrease in pressure at said location to open said valve means, and restricted bleed means associated with said pressure actuated means for gradually balancing the pressure forces thereon and for reclosing said valve means after a predetermined interval regardless of the duration of said predetermined decrease in said pressure at said location.

3. The combination according to claim 2 wherein said pressure actuated means includes a pressure chamber partitioned into two parts by a movable wall, one of said parts being in communication with said conduit means downstream of said throttle valve to vary the pressure on one side of said wall in accordance with the pressure downstream of said throttle valve, and wherein said restricted bleed means includes a restricted port connecting the two parts of said chamber.

4. In a fuel charging system for an internal combustion engine having conduit means for supplying air to said engine, means for supplying fuel to said conduit means, a throttle valve in said conduit means for controlling the air flow therein to said engine, means for bypassing said throttle valve comprising a bypass conduit connecting said conduit means at a location downstream of said throttle valve with air at a pressure equal to the air pressure in said conduit means upstream of said throttle valve, valve means in said bypass conduit, resilient means urging said valve means to a closed condition, a pressure chamber, a pressure actuated movable wall partitioning said chamber, means for applying the pressure of said conduit means downstream of said throttle valve to one side of said wall, restricted fluid bleed means connecting the other side of said wall to the last named pressure for gradually balancing the fluid pressure forces at opposite sides of said wall regardless of the duration of low pressure at said one side of said wall, and means operably connecting said wall and valve means to urge the latter to an open condition when the pressure applied to said one side of said wall is reduced a predetermined amount with respect to the pressure at the opposite side of said wall.

5. In a fuel charging system for an internal combustion engine having conduit means for supplying air to said engine, means for supplying fuel to said conduit means, a throttle valve in said conduit means for controlling the air flow therein to said engine, means for bypassing said throttle valve comprising a bypass conduit connecting said conduit means at a location downstream of said throttle valve with air at a pressure equal to the air pressure in said conduit means upstream of said throttle valve, valve means normally closing said bypass conduit, a pressure chamber, a pressure actuated movable wall partitioning said chamber, means for applying the pressure of said conduit means downstream of said throttle valve to one side of said wall, restricted fluid bleed means for gradually balancing the fluid pressure forces at opposite sides of said wall regardless of the duration of low pressure at said one side of said wall, and means operably connecting said wall and valve means to open the latter when the pressure applied to said one side of said wall is reduced a predetermined amount with respect to the pressure at the opposite side of said wall.

6. In a fuel charging system for an internal combustion engine having conduit means for supplying air to said engine, means for supplying fuel to said conduit means, a throttle valve in said conduit means for controlling the air flow therein to said engine, means for bypassing said throttle valve comprising a bypass conduit connecting said conduit means at a location downstream of said throttle valve with air at a pressure equal to the air pressure in said conduit means upstream of said throttle valve, valve means normally closing said bypass conduit, pressure actuated means operably connected with said valve means and responsive to a rapid decrease in pressure at said location to open said valve means, restricted bleed means associated with said pressure actuated means for gradually balancing the pressure forces thereon and for gradually reclosing said valve means regardless of the duration of the decreased pressure at said location, a pressure equalizing duct associated with said pressure actuating means for rapidly balancing the pressure forces thereon when the pressure at said location rapidly increases, and one way check valve means for closing said duct during a reduction in the pressure at said location.

7. In a fuel charging system for an internal combustion engine having conduit means for supplying air to said engine, means for supplying fuel to said conduit means, a throttle valve in said conduit means for controlling the air flow therein to said engine, means for bypassing said throttle valve comprising a bypass conduit connecting said conduit means at a location downstream of said throttle valve with air at a pressure equal to the air pressure in said conduit means upstream of said throttle valve, valve means normally closing said bypass conduit, a pressure chamber, a pressure actuated movable wall partitioning said chamber, means for applying the pressure of said conduit means downstream of said throttle valve to one side of said wall, restricted fluid bleed means for gradually balancing the fluid pressure forces at opposite sides of said wall, a pressure equalizing duct for rapidly balancing the pressure forces at opposite sides of said wall when the pressure at said one side of said wall exceeds the pressure at the opposite side of said wall, one-way check valve means for closing said duct when the pressure at said opposite side exceeds the pressure at said one side, and means operably connecting said wall and first-named valve means to open the latter when the pressure applied to said one side of said wall is rapidly reduced with respect to the pressure at said opposite side.

References Cited in the file of this patent
UNITED STATES PATENTS

| 2,376,228 | Brown | May 15, 1945 |
| 2,415,491 | Hieger | Feb. 11, 1947 |

FOREIGN PATENTS

| 807,146 | Germany | June 25, 1951 |
| 1,113,973 | France | Dec. 12, 1955 |